US010554661B2

(12) United States Patent
McCann

(10) Patent No.: US 10,554,661 B2
(45) Date of Patent: Feb. 4, 2020

(54) METHODS, SYSTEMS, AND COMPUTER READABLE MEDIA FOR PROVIDING ACCESS NETWORK SESSION CORRELATION FOR POLICY CONTROL

(71) Applicant: Oracle International Corporation, Redwood Shores, CA (US)

(72) Inventor: Thomas Matthew McCann, Raleigh, NC (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 14/826,289

(22) Filed: Aug. 14, 2015

(65) Prior Publication Data

US 2017/0048190 A1 Feb. 16, 2017

(51) Int. Cl.
*H04L 29/06* (2006.01)
(52) U.S. Cl.
CPC ............... *H04L 63/0892* (2013.01)
(58) Field of Classification Search
CPC ........... H04L 29/12245; H04L 61/203
See application file for complete search history.

(56) References Cited

U.S. PATENT DOCUMENTS

| 1,872,857 | A | 4/1931 | Wesson et al. |
| 5,878,347 | A | 3/1999 | Joensuu et al. |
| 6,006,098 | A | 12/1999 | Rathnasabapathy et al. |
| 6,298,383 | B1 | 10/2001 | Gutman et al. |
| 6,836,477 | B1 | 12/2004 | West, Jr. et al. |
| 6,967,956 | B1 | 11/2005 | Tinsley et al. |
| 7,292,592 | B2 | 11/2007 | Rune |
| 7,310,307 | B1 | 12/2007 | Das et al. |
| 7,319,857 | B2 | 1/2008 | Baldwin et al. |
| 7,551,926 | B2 | 6/2009 | Rune |
| 7,738,488 | B2 | 6/2010 | Marsico et al. |
| 7,792,981 | B2 | 9/2010 | Taylor |

(Continued)

FOREIGN PATENT DOCUMENTS

| CN | 1809072 A | 7/2006 |
| CN | 101001440 A | 7/2007 |

(Continued)

OTHER PUBLICATIONS

Commonly-assigned, co-pending U.S. Appl. No. 14/929,283 for "Methods, Systems, and Computer Readable Media for Remote Access Dial in User Service (RADIUS) Proxy and Diameter Agent Address Resolution." (Unpublished, filed Oct. 31, 2015).

(Continued)

*Primary Examiner* — Jeffrey M Rutkowski
*Assistant Examiner* — Chae S Lee
(74) *Attorney, Agent, or Firm* — Jenkins, Wilson, Taylor & Hunt, P.A.

(57) ABSTRACT

A method for access network session correlation for policy control includes detecting a remote authentication dial in user service (RADIUS) access session for a user device, including binding the RADIUS access session to a policy node. The method includes detecting a Diameter session for the user device. The method further includes correlating the RADIUS access session with the Diameter session, including binding the Diameter session to the policy node.

17 Claims, 9 Drawing Sheets

(56) References Cited

U.S. PATENT DOCUMENTS

| | | |
|---|---|---|
| 7,814,015 B2 | 10/2010 | Benedyk et al. |
| 7,844,745 B1 | 11/2010 | Darbyshire et al. |
| 7,916,685 B2 | 3/2011 | Schaedler et al. |
| 7,996,541 B2 | 8/2011 | Marathe et al. |
| 8,015,293 B2 | 9/2011 | Schaedler et al. |
| 8,532,110 B2 | 9/2013 | McCann et al. |
| 8,547,908 B2 | 10/2013 | Marsico |
| 8,615,237 B2 | 12/2013 | Baniel et al. |
| 8,737,304 B2 | 5/2014 | Karuturi et al. |
| 8,825,060 B2 | 9/2014 | McCann et al. |
| 8,831,076 B2 | 9/2014 | Yen |
| 8,918,469 B2 | 12/2014 | Sprague et al. |
| 8,942,747 B2 | 1/2015 | Marsico |
| 9,059,948 B2 | 6/2015 | Schaedler et al. |
| 9,148,524 B2 | 9/2015 | Deo |
| 9,288,169 B2 | 3/2016 | Schaedler et al. |
| 9,319,378 B2 | 4/2016 | McCann |
| 9,668,134 B2 | 5/2017 | McCann |
| 9,668,135 B2 | 5/2017 | McCann |
| 9,918,229 B2 | 3/2018 | McCann |
| 9,923,984 B2 | 3/2018 | McCann et al. |
| 9,930,528 B2 | 3/2018 | McCann |
| 10,084,755 B2 | 9/2018 | McCann |
| 2001/0028636 A1 | 10/2001 | Skog et al. |
| 2002/0147845 A1 | 10/2002 | Sanchez-Herrero |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0098612 A1 | 5/2004 | Lee et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0242227 A1 | 12/2004 | Huotari et al. |
| 2004/0246965 A1 | 12/2004 | Westman et al. |
| 2004/0260816 A1 | 12/2004 | Skog et al. |
| 2005/0007984 A1 | 1/2005 | Shaheen et al. |
| 2005/0009520 A1 | 1/2005 | Herrero et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0120198 A1 | 6/2005 | Bajko et al. |
| 2005/0124341 A1 | 6/2005 | Myllymaki et al. |
| 2005/0136926 A1 | 6/2005 | Tammi et al. |
| 2005/0155036 A1 | 7/2005 | Tiainen et al. |
| 2005/0159156 A1 | 7/2005 | Bajko et al. |
| 2005/0227675 A1 | 10/2005 | Lim et al. |
| 2006/0002308 A1 | 1/2006 | Na et al. |
| 2006/0030320 A1 | 2/2006 | Tammi et al. |
| 2006/0045249 A1 | 3/2006 | Li et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0172730 A1 | 8/2006 | Matsuda |
| 2006/0221972 A1 | 10/2006 | Bhargava et al. |
| 2006/0274744 A1 | 12/2006 | Nagai et al. |
| 2007/0121596 A1 | 5/2007 | Kurapati et al. |
| 2007/0136590 A1 | 6/2007 | Nah et al. |
| 2007/0153995 A1* | 7/2007 | Fang ............... H04M 15/00 379/114.03 |
| 2007/0189215 A1 | 8/2007 | Wu et al. |
| 2007/0242637 A1 | 10/2007 | Dynarski et al. |
| 2007/0297419 A1 | 12/2007 | Askerup et al. |
| 2008/0002652 A1 | 1/2008 | Gupta et al. |
| 2008/0039104 A1 | 2/2008 | Gu et al. |
| 2008/0256251 A1 | 10/2008 | Huotari et al. |
| 2009/0080440 A1 | 3/2009 | Balyan et al. |
| 2009/0089435 A1 | 4/2009 | Terrill et al. |
| 2009/0129271 A1 | 5/2009 | Ramankutty et al. |
| 2009/0156213 A1 | 7/2009 | Spinelli et al. |
| 2009/0177796 A1 | 7/2009 | Falk et al. |
| 2009/0196231 A1 | 8/2009 | Giaretta et al. |
| 2009/0196290 A1 | 8/2009 | Zhao et al. |
| 2009/0221310 A1 | 9/2009 | Chen et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2010/0268814 A1 | 10/2010 | Cross et al. |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1 | 12/2010 | Stenfelt et al. |
| 2010/0331023 A1 | 12/2010 | Cai et al. |
| 2011/0040845 A1 | 2/2011 | Cai et al. |
| 2011/0116378 A1 | 5/2011 | Ramankutty et al. |
| 2011/0116382 A1 | 5/2011 | McCann et al. |
| 2011/0154454 A1 | 6/2011 | Frelechoux |
| 2011/0158090 A1 | 6/2011 | Riley et al. |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Graig et al. |
| 2011/0202676 A1 | 8/2011 | Craig et al. |
| 2011/0211574 A1 | 9/2011 | Li et al. |
| 2011/0225113 A1 | 9/2011 | Mann |
| 2011/0225280 A1 | 9/2011 | Delsesto et al. |
| 2011/0225281 A1* | 9/2011 | Riley ............... H04L 12/14 709/223 |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0089993 A1 | 4/2012 | Alonso Alarcon et al. |
| 2012/0096177 A1 | 4/2012 | Rasanen |
| 2012/0124220 A1 | 5/2012 | Zhou et al. |
| 2012/0129488 A1 | 5/2012 | Patterson et al. |
| 2012/0155389 A1 | 6/2012 | McNamee et al. |
| 2012/0155470 A1 | 6/2012 | McNamee et al. |
| 2012/0177028 A1* | 7/2012 | Mo ............... H04L 12/1407 370/351 |
| 2012/0201203 A1 | 8/2012 | Miyagawa et al. |
| 2012/0202550 A1 | 8/2012 | Marsico |
| 2012/0207015 A1 | 8/2012 | Marsico |
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0236871 A1 | 9/2012 | Wallace et al. |
| 2012/0239771 A1 | 9/2012 | Rasanen |
| 2012/0265888 A1* | 10/2012 | Roeland ............ H04L 12/14 709/228 |
| 2012/0311064 A1 | 12/2012 | Deo |
| 2013/0171990 A1 | 7/2013 | McCann et al. |
| 2013/0246639 A1 | 9/2013 | Nedbal et al. |
| 2013/0279497 A1 | 10/2013 | Verma et al. |
| 2013/0304843 A1 | 11/2013 | Chow et al. |
| 2013/0311672 A1* | 11/2013 | Chastain ......... H04L 67/143 709/238 |
| 2014/0092899 A1 | 4/2014 | Krishna et al. |
| 2014/0207941 A1 | 7/2014 | McCann |
| 2014/0258423 A1 | 9/2014 | Schaedler et al. |
| 2014/0321278 A1* | 10/2014 | Cafarelli ........ H04L 47/2441 370/235 |
| 2014/0342690 A1* | 11/2014 | Tanouchev ........ H04M 15/66 455/405 |
| 2014/0355523 A1 | 12/2014 | Congdon et al. |
| 2015/0036486 A1 | 2/2015 | McMurry et al. |
| 2015/0117420 A1 | 4/2015 | Raman et al. |
| 2015/0149656 A1 | 5/2015 | McMurry et al. |
| 2016/0373348 A1 | 12/2016 | Renzullo et al. |
| 2017/0048202 A1 | 2/2017 | McCann |
| 2017/0048703 A1 | 2/2017 | McCann |
| 2017/0048704 A1 | 2/2017 | McCann |
| 2017/0126522 A1 | 5/2017 | McCann et al. |

(56) References Cited

U.S. PATENT DOCUMENTS

| | | | |
|---|---|---|---|
| 2017/0238178 | A1 | 8/2017 | McCann |
| 2017/0238179 | A1 | 8/2017 | McCann |

FOREIGN PATENT DOCUMENTS

| | | | |
|---|---|---|---|
| CN | 101079742 | A | 11/2007 |
| CN | 101247321 | A | 8/2008 |
| CN | 101277541 | A | 10/2008 |
| CN | 101483826 | A | 7/2009 |
| CN | 101867873 | A | 10/2010 |
| CN | 101945047 | A | 1/2011 |
| CN | 102656845 | A | 9/2012 |
| CN | ZL 201080065174.6 | | 6/2015 |
| CN | 100037 | | 7/2016 |
| CN | 103477661 | B | 10/2016 |
| CN | 103493522 | B | 12/2016 |
| CN | ZL201280019607.3 | | 12/2016 |
| CN | ZL201280013938.6 | | 3/2017 |
| CN | ZL201280018298.8 | | 3/2017 |
| CN | ZL201280018288.4 | | 4/2017 |
| CN | ZL201480005758.2 | | 7/2019 |
| EP | 1 357 720 | A1 | 10/2003 |
| EP | 1 630 999 | A1 | 3/2006 |
| EP | 2 107 725 | A1 | 10/2009 |
| EP | 2 234 422 | A1 | 9/2010 |
| EP | 2 242 205 | A1 | 10/2010 |
| EP | 2 220 841 | B1 | 9/2011 |
| EP | 1 846 832 | B1 | 4/2012 |
| EP | 2 466 828 | A1 | 6/2012 |
| EP | 2 681 940 | B1 | 5/2016 |
| EP | 2 681 939 | B1 | 9/2016 |
| EP | 2 522 102 | B1 | 11/2016 |
| EP | 2 681 938 | B2 | 12/2016 |
| JP | H10-98470 | A | 4/1998 |
| JP | H11-224219 | A | 8/1999 |
| JP | 2004-242326 | A | 8/2004 |
| JP | 4041038 | B2 | 1/2008 |
| JP | 2010-0278884 | A | 12/2010 |
| JP | 2013-527999 | T | 7/2013 |
| JP | 5938052 | B2 | 6/2016 |
| JP | 5950943 | B2 | 7/2016 |
| JP | 6091657 | B2 | 2/2017 |
| WO | WO 2004/064442 | A1 | 7/2004 |
| WO | WO 2006/066149 | A2 | 6/2006 |
| WO | WO 2009/058067 | A1 | 5/2009 |
| WO | WO 2009/070179 | A1 | 6/2009 |
| WO | WO 2010/139360 | A1 | 12/2010 |
| WO | WO 2011/082035 | A2 | 7/2011 |
| WO | WO 2011/082090 | A2 | 7/2011 |
| WO | WO 2011/082895 | A1 | 7/2011 |
| WO | WO 2012/106710 | A1 | 8/2012 |
| WO | WO 2012/118959 | A1 | 9/2012 |
| WO | WO 2012/118963 | A1 | 9/2012 |
| WO | WO 2012/118967 | A1 | 9/2012 |
| WO | WO 2012/119147 | A1 | 9/2012 |
| WO | WO 2012/154674 | A2 | 11/2012 |
| WO | WO 2014/116464 | A1 | 7/2014 |

OTHER PUBLICATIONS

Commonly-assigned, co-pending U.S. Appl. No. 14/928,660 for "Methods, Systems, and Computer Readable Media for Remote Authentication Dial in User Service (RADIUS) Message Loop Detection and Mitigation," (Unpublished, filed Oct. 30, 2015).
Commonly-assigned, co-pending U.S. Appl. No. 14/827,015 for "Methods, Systems, and Computer Readable Media for Providing Access Network Protocol Interworking and Authentication Proxying," (Unpublished, filed Aug. 14, 2015).
Commonly-assigned, co-pending U.S. Appl. No. 14/827,025 for "Methods, Systems, and Computer Readable Media for Providing Access Network Signaling Protocol Interworking for User Authentication," (Unpublished, filed Aug. 14, 2015).

Fajardo et al., "Diameter Base Protocol," RFC 6733, pp. 1-152 (Oct. 2012).
"Multi-Protocol Routing Agent User's Guide," 910-6404-001 Revision A, Policy Management, Tekelec, pp. 1-70 (Jun. 2012).
"Traffix Signaling Delivery Controller—One Platform to Deliver the Wonders of 4G," Traffix Systems, The Diameter Control Plane Experts, pp. 1-7 (2011).
"Traffix Signaling Delivery Controller (SDC)," Traffix Systems, The Diameter Control Plane Experts, pp. 1-5 (2011).
"Traffix Signaling Delivery Controller (SDC) Diameter Gateway—Use Case Development Scenarios," Traffix Systems, The Diameter Control Plane Experts, www.traffixsystems.com pp. 1-4 (2011).
"Traffix Signaling Delivery Controller Diameter Load Balancer: Scalability for your Control Plane," Traffix Systems, The Diameter Control Plane Experts, www.traffixsystems.com pp. 1-3 (2011).
Gundavelli et al., "Network Mobility (NEMO) Management Information Base," RFC 5488, pp. 1-44 (Apr. 2009).
Arkko et al., "Extensible Authentication Protocol Method for 3rd Generation Authentication and Key Agreement (EAP-AKA)," RFC 4187, pp. 1-79 (Jan. 2006).
Haverinen et al., "Extensible Authentication Protocol Method for Global System for Mobile Communications (GSM) Subscriber Identity Modules (EAP-SIM)," RFC 4186, pp. 1-80 (Jan. 2006).
Aboba et al., "Extensible Authentication Protocol (EAP)," RFC 3748, pp. 1-67 (Jun. 2004).
Calhoun et al., "Diameter Base Protocol," RFC 3588, pp. 1-147 (Sep. 2003).
Aboba et al., "RADIUS (Remote Authentication Dial in User Service) Support For Extensible Authentication Protocol (EAP)," RFC 3579, pp. 1-46 (Sep. 2003).
"ITP Operations Manual," Cisco Systems, Inc., pp. 1-320 (May 1, 2002).
"Configuring ITP Optional Features," IP Transfer Point, Cisco Systems, Inc., pp. 29-76 (2001).
"Cisco IP Transfer Point Q & A," Cisco Systems, Inc., pp. 1-15 (1992-2001).
Rigney et al., "RADIUS Accounting," RFC 2866, pp. 1-28 (Jun. 2000).
Communication under Rule 71(3) EPC for European Application No. 12 751 986.6 (dated Jun. 8, 2016).
Letter Regarding Notice of grant for Japanese Patent Application No. 2013-552714 (dated May 31, 2016).
Decision to grant a European patent pursuant to Article 97(1) EPC for European Application No. 12752952.7 (dated Apr. 29, 2016).
Notification of the First Office Action for Chinese Patent Application No. 201280018298.8 (dated Mar. 3, 2016).
Communication pursuant to Article 94(3) EPC for European Patent Application No. 10841605.8 (dated Feb. 22, 2016).
Communication under Rule 71(3) EPC for European Patent Application No. 12752952.7 (dated Feb. 10, 2016).
Notification of the First Office Action for Chinese Application No. 201280019607.3 (dated Feb. 1, 2016).
Notification of the First Office Action for Chinese Application No. 201280013938.6 (dated Jan. 27, 2016).
Letter Regarding Office Action for Japanese Patent Application No. 2013-552714 (dated Dec. 8, 2015).
Communication pursuant to Article 94(3) EPC for European Application No. 12 751 783.7 (dated Mar. 15, 2017)
Notice of Allowance and Fee(s) Due for U.S. Appl. No. 14/827,015 (dated Mar. 10, 2017).
Letter Regarding Decision to Grant for Chinese Application No. ZL201280018288.4 (dated Feb. 14, 2017)
Letter Regarding Decision to Grant for Chinese Application No. ZL201280013938.6 (dated Feb. 3, 2017).
Notice of Allowance and Fee(s) Due for U.S. Appl. No. 14/827,025 (dated Jan. 20, 2017)
Non-Final Office Action for U.S. Appl. No. 14/742,679 (dated Feb. 2, 2017).
Letter Regarding Notice of Grant for Japanese Patent Application No. 2015-553784 (dated Jan. 24, 2017).
Letter Regarding Decision to Grant for Chinese Patent Application No. ZL201280018298.8 (dated Jan. 10, 2017).

(56) References Cited

OTHER PUBLICATIONS

Extended European Search Report for European Patent Application No. 12741984.4 (dated Dec. 20, 2016).
Applicant-Initiated Interview Summary for U.S. Appl. No. 14/827,025 (dated Dec. 13, 2016).
Decision to grant a European patent pursuant to Article 97(1) EPC for European Patent Application No. 12751812.4 (dated Nov. 24, 2016).
Decision to grant a European patent pursuant to Article 97(1) EPC for European Patent Application No. 10841605.8 (dated Oct. 27, 2016).
Supplemental Notice of Allowability & Response to Rule 312 Communication for U.S. Appl. No. 13/465,552 (dated Aug. 27, 2015).
Final Office Action for U.S. Appl. No. 13/748,547 (dated Aug. 10, 2015).
Letter Regarding Publication of Patent for Japanese Patent Application No. 2014-5093509 (dated Aug. 5, 2015).
Letter Regarding Publication of Patent for Japanese Patent Application No. 2013-556857 (dated Aug. 5, 2015).
Letter Regarding Office Action for Japanese Patent Application No. 2013-556860 (dated Jul. 21, 2015).
Non-Final Office Action for U.S. Appl. No. 14/190,071 (dated Jul. 8, 2015).
Letter Regarding Publication of Patent for Japanese Patent Application No. 2013-556675 (dated Jun. 10, 2015).
Letter Regarding Notice of Grant for Japanese Patent Application No. 2014-509509 (dated Jun. 2, 2015).
Letter Regarding Notice of Grant for Japanese Patent Application No. 2013-556857 (dated May 26, 2015).
Notice of Allowance and Fee(s) Due and Examiner-Initiated Interview Summary for U.S. Appl. No. 13/465,552 (dated May 20, 2015).
Decision to Grant for Chinese Patent Application No. 201080065174.6 (dated Apr. 16, 2015).
Second Office Action for Japanese Patent Application No. 2013-556857 (dated Apr. 14, 2015).
Letter Regarding Notice of Grant for Japanese Patent Application No. 2013-556675 (dated Mar. 31, 2015).
Letter Regarding Office Action for Japanese Patent Application No. 2013-556855 (dated Feb. 24, 2015).
Notice of Allowance and Fee(s) Due and Examiner-Initiated Interview Summary for U.S. Appl. No. 13/192,410 (dated Feb. 12, 2015).
Applicant-Initiated Interview Summary for U.S. Appl. No. 13/465,552 (dated Feb. 9, 2015).
Notice of Panel Decision from Pre-Appeal Brief Review for U.S. Appl. No. 13/192,410 (dated Feb. 4, 2015).
Extended European Search Report for European Patent Application No. 12751986.6 (dated Jan. 20, 2015).
Non-Final Office Action for U.S. Appl. No. 13/748,547 (dated Jan. 5, 2015).
Supplemental Notice of Allowability for U.S. Appl. No. 13/366,928 (dated Dec. 26, 2014).
Non-Final Office Action for U.S. Appl. No. 13/465,552 (dated Oct. 17, 2014).
Letter Regarding Office Action for Japanese Patent Application No. 2013-556675 (dated Sep. 30, 2014).
Final Office Action for U.S. Appl. No. 13/192,410 (dated Sep. 25, 2014).
First Office Action for Japanese Application No. 2013-556857 (dated Sep. 24, 2014).
Notice of Allowance and Fee(s) Due for U.S. Appl. No. 13/366,928 (dated Sep. 3, 2014).
Extended European Search Report for European Application No. 12752952.7 (dated Aug. 27, 2014).
Notification of the First Office Action for Chinese Application No. 201080065174.6 (dated Aug. 13, 2014).
Extended European Search Report for European Application No. 12751783.7 (dated Jul. 22, 2014).
Extended European Search Report for European Application No. 12751812.4 (dated Jul. 16, 2014)
Notice of Allowance and Fee(s) Due for U.S. Appl. No. 13/409,893 (dated Jul. 10, 2014).
Notice of Allowance and Fee(s) Due for U.S. Appl. No. 13/409,914 (dated Apr. 25, 2014).
Supplemental Notice of Allowability for U.S. Appl. No. 13/409,949 (dated Apr. 24, 2014).
Notification of Transmittal of the International Search Report and the Written Opinion of the International Searching Authority, or the Declaration for International Patent Application No. PCT/US2014/011548 (dated Mar. 28, 2014).
Non-Final Office Action for U.S. Appl. No. 13/366,928 (dated Mar. 21, 2014).
Non-Final Office Action for U.S. Appl. No. 13/192,410 (dated Feb. 20, 2014).
Communication of European publication number and information on the application of Article 67(3) EPC for European Application No. 12781800.3 (dated Feb. 12, 2014).
Advisory Action Before the Filing of an Appeal Brief for U.S. Appl. No. 13/366,928 (dated Feb. 10, 2014).
Extended European Search Report for European Application No. 10841605.8 (dated Feb. 3, 2014).
Notice of Allowance and Fee(s) Due for U.S. Appl. No. 13/409,949 (dated Jan. 14, 2014).
Final Office Action for U.S. Appl. No. 13/409,914 (dated Dec. 30, 2013).
Notification of Publication and Entry into Examination Procedure for Chinese Patent Application No. 201280013938.6 (dated Dec. 18, 2013).
Communication of European publication number and information on the application of Article 67(3) EPC for European Application No. 12751986.6 (Dec. 11, 2013).
Communication of European fubiication number and information on the application of Article 67(3) EPC for European Application No. 12751783.7 (Dec. 11, 2013).
Communication of European publication number and information on the application of Article 67(3) EPC for European Application No. 12751812.4 (Dec. 11, 2013).
Communication of European publication number and information on the application of Article 67(3) EPC for European Application No. 12741984.4 (dated Nov. 13, 2013).
Declaration of Mark Kanode for U.S. Appl. No. 13/409,893 (dated Nov. 1, 2013).
Advisory Action for U.S. Appl. No. 13/192,410 (dated Oct. 24, 2013).
Final Office Action for U.S. Appl. No. 13/366,928 (dated Oct. 23, 2013).
Applicant-Initiated Interview Summary for U.S. Appl. No. 13/192,410 (dated Oct. 18, 2013).
Final Office Action for U.S. Appl. No. 13/409,349 (dated Sep. 19, 2013).
Advisory Action Before the Filing of an Appeal Brief for U.S. Appl. No. 13/409,893 (dated Sep. 13, 2013).
Notice of Allowance and Fee(s) Due for U.S. Appl. No. 12/974,869 (dated Aug. 19, 2013).
Final Office Action for U.S. Appl. No. 13/192,410 (dated Aug. 5, 2013).
Final Office Action for U.S. Appl. No. 13/409,893 (dated Jul. 1, 2013).
Non-Final Office Action for U.S. Appl. No. 13/409,914 (dated Jun. 7, 2013).
Notice of Allowance and Fee(s) Due for U.S. Appl. No. 13/412,352 (dated May 28, 2013).
Non-Final Office Action for U.S. Appl. No. 13/366,928 (dated Mar. 26, 2013).
Non-Final Office Action for U.S. Appl. No. 13/409,949 (dated Feb. 15, 2013).
Notice of Allowance and Fee(s) Due for U.S. Appl. No. 13/366,928 (dated Jan. 7, 2013).
Non-Final Office Action for U.S. Appl. No. 13/192,410 (dated Dec. 20, 2012).

(56) References Cited

OTHER PUBLICATIONS

Non-Final Office Action for U.S. Appl. No. 13/409,893 (dated Dec. 13, 2012).
Non-Final Official Action for U.S. Appl. No. 12/409,914 (dated Nov. 6, 2012).
Notification of Transmittal of the International Search Report and the Written Opinion of the International Searching Authority, or the Declaration for International Patent Application No. PCT/US2012/036784 (dated Nov. 1, 2012).
Non-Final Official Action for U.S. Appl. No. 13/412,352 (dated Oct. 26, 2012).
Communication of European publication number and information on the application of Article 67(3) EPC for European Patent Application No. 10841605.8 (dated Oct. 17, 2012).
Notification of Transmital of the International Search Report and the Written Opinion of the International Searching Authority, or the Declaration for International Patent Application No. PCT/US2012/027281 (dated Jun. 15, 2012).
Notification of Transmittal of the International Search Report and the Written Opinion of the International Searching Authority, or the Declaration for International Application No. PCT/US2012/027263 (dated Jun. 14, 2012).
Notification of Transmittal of the International Search Report and the Written Opinion of the International Searching Authority, or the Declaration for International Patent Application No. PCT/US2012/027736 (dated Jun. 12, 2012).
Notification of Transmittal of the International Search Report and the Written Opinion of the International Searching Authority, or the Declaration for International Patent Application No. PCT/US2012/023971 (dated Jun. 11, 2012).
Notification of Transmittal of the International Search Report and the Written Opinion of the International Searching Authority, or the Declaration for International Patent Application No. PCT/US2012/027269 (dated Jun. 11, 2012).
Decision to grant a European patent pursuant to Article 97(1) EPC for European Application No. 05854512.0 (dated Mar. 15, 2012).
Communication under Rule 71(3) EPC for European application No. 05854512.0 (dated Nov. 11, 2011).
Notification of the Transmittal of the International Search Report and the Written Opinion of the International Searching Authority, or the Declaration for International Application No. PCT/US2010/061934 (dated Oct. 25, 2011).
Notice of Allowance and Fee(s) Due for U.S. Appl. No. 11/303,757 (dated May 11, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
Official Action for U.S. Appl. No. 11/303,757 (dated Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0 (dated Dec. 2010).
Communication pursuant to Article 94(3) EPC for European Application No. 05 854 512.0 (dated Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management;

Charging management; Packet Switched (PS) domain charging (Release 9)," 3GPPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE+ePC=EPS), IMS, PCC and SDM," EFORT, pp. 1-229 (Part 2 of 2) (May 2010).
Znaty, "Diameter, GPRS, (LTE+ePC=SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
Communication pursuant to Article 94(3) EPC for European Application No. 05854512.0 (dated Feb. 8, 2010).
Final Official Action for U.S. Appl. No. 11/303,757 (dated Dec. 9, 2009).
"3rd Generation Partnership Project; Technical Specification Group Services and System Aspects; Policy and charging control architecture (Release 9)," 3GPP TS 23.203, V9.3.0 (Dec. 2009).
Supplementary European Search Report for European Application No. 05854512.0 (dated Nov. 17, 2009).
Official Action for U.S. Appl. No. 11/303,757 (dated May 28, 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8 (Jun. 5, 2009).
3GPP, "3rd Generation Partnership Project; Technical Specification Group Core Network and Terminals; IP Multimedia (IM) Subsystem Sh interface; Singalling flows and message contents (Release 8)," 3GPP TS 29.328 V8.4.0, pp. 1-42 (Mar. 2009).
Final Official Action for U.S. Appl. No. 11/303,757 (dated Oct. 6, 2008).
Official Action for U.S. Appl. No. 11/303,757 (dated May 7, 2008).
Notification of Transmittal of the International Search Report and the Written Opinion corresponding to International Application No. PCT/US05/45813 (dated Mar. 24, 2008).
Official Action for U.S. Appl. No. 11/303,757 (dated Feb. 21, 2008).
Chiba et al., "Dynamic Authorization Extensions to Remote Authentication Dial in User Service (RADIUS)," RFC 5176, pp. 1-32 (Jan. 2008).
Restriction Requirement for U.S. Appl. No. 11/303,757 (dated Oct. 4, 2007).
"Tekelec Announces TekCore IMS Core Platform," (Jun. 5, 2006).
"Operator Guidebook to IMS and New Generation Networks and Services." www.morianagroup.com, Second Edition (Feb. 2006).
Liu et al., "IBM Technical Library, Introduction to Diameter," pp. 1-9, http://www.ibm.com/developerworks/wireless/library/wi-diameter (Jan. 24, 2006).
Rouse, "Platform," http://searchservervirtualization.techtarget.com/definition/platform, pp. 1-2 (2006-2009).
Camarillo et al., "The 3G IP Multimedia Subsystem (IMS), Merging the Internet and the Ceilular Worlds," Second Edition (2006).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).

(56) References Cited

OTHER PUBLICATIONS

"Operator Guidebook to IMS and New Generation Networks and Services," www.morianagroup.com, First Edition, pp. 451-934 (Aug. 2005) (Part 2 of 2).
Gonzalo et al., "The 3G IP Muitimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP.2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 9.229, V5.6.0, pp. 1-23 (Dec. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, v5.7.0, pp. 1-130 (Dec. 2002).
Olson et al., "Support for IPv6 in Session Description Protocol (SDP)," RFC 3266, pp. 1-5 (June 2002).
Rosenberg et al., "SIP: Session Initiation Protocol," RFC 3261, pp. 1-252 (Jun. 2002).
Howard, "Sipping IETF/51 3GPP Security and Authentication," http://www3.ietf.org/proceedings/01aug/slides/sipping-7/index.htm (Dowloaded from Internet on Dec. 16, 2005) (Sep. 13, 2001).
Narten et al., "Privacy Extensions for Stateless Address Autoconfiguration in IPv6." RFC 3041, pp. 1-16 (Jan. 2001).
Faltstrom, "E.164 Number and DNS," RFC 2916, pp. 1-10 (Sep. 2000).
Rigney et al., "RADIUS Accounting," RFC 2866, pp. 1-26 (Jun. 2000).
Rigney et al., "Remote Authentication Dial In User Service (RADIUS)," RFC 2865, pp. 1-70 (Jun. 2000).
Vaha-Sipila, "URLs for Telephone Calls," RFC 2806, pp. 1-20 (Apr. 2000).
Aboba et al., "The Network Access Identifier." RFC 2486, pp. 1-8 (Jan. 1999).
Calhoun et al., "Diameter Proxy Sewer Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Non-Final Office Action for U.S. Appl. No. 14/827,015 (dated Oct. 31, 2016).
Letter Regarding Decision to Grant a Chinese Patent for Chinese Patent Appication No. ZL201280019607.3 (dated Oct. 10, 2016).
Notification of the Second Office Action for Chinese Patent Application No. 201280013938.6 (dated Oct. 9, 2016).
Notification of the Second Office Action for Chinese Patent Application No. 201280018288.4 (dated Sep. 5, 2016).
Communication under Rule 71(3) EPC for European Patent Application No. 12 751 812.4 (dated Sep. 2, 2016).
Non-Final Office Action for U.S. Appl. No. 14/827,025 (dated Aug. 26, 2016).
Decision to grant a European patent pursuant to Article 97(1) EPC for European Patent Applicaton No. 12751986.6 (dated Aug. 19, 2016)
Intent to Grant for European Patent Application No. 10841605.8 (dated Aug. 12, 2016).
Letter Regarding Office Action for Japanese Patent Application No. 2015-553784 (dated Jul. 19, 2016).
Letter Regarding Notice of Grant for Chinese Patent Application No. ZL201280018297.3 (dated Jul 4, 2016).
Official Notice of Grant for Japanese Patent Application No. 2013-556860 (dated Apr. 26, 2016).
Letter Regarding Notice of Grant for Japanese Patent Application No. 2013-556855 (dated Feb. 2, 2016).
Notification of the First Office Action for Chinese Application No. 201280018297.3 (dated Jan. 15, 2016).
Notification of the First Office Action for Chinese Application No. 201280018288.4 (dated Dec. 29, 2015).
Communication pursuant to Article 94(3) EPC for European Application No. 12 751 986.6 (dated Dec. 22, 2015).
Notice of Allowance and Fee(s) Due for U.S. Appl. No. 13/748,547 (dated Dec. 11, 2015).
Letter Regarding Final Rejection for Japanese Patent Application No. 2013-556860 (dated Nov. 17, 2015).
Communication of European publication number and information on the application of Article 67(3) EPC for European Application No. 14702996.1 (dated Nov. 4, 2015).
Notice of Allowance and Fee(s) Due and Applicant-Initiated Interview Summary for U.S. Appl. No. 14/190,071 (dated Oct. 30, 2015).
Advisory Action for U.S. Appl. No. 13/748,547 (dated Oct. 16, 2015).
Final Office Action for U.S. Appl. No. 14/742,679 (dated Jun. 30, 2017).
Non-Final Office Action for U.S. Appl. No. 15/582,591(dated Jun. 30, 2017).
Non-Final Office Action for U.S. Appl. No. 15/582,503 (dated Jun. 30, 2017).
Commonly-assigned, co-pending Divisonal U.S. Appl. No. 15/582,591 for "Methods, Systems, and Computer Readable Media for Providing Access Network Protocol Interworking and Authentication Proxying," (Unpublished, filed Apr. 28, 2017).
Commonly-assigned, co-pending U.S. Appl. No. 15/582,503 for "Methods, Systems, and Computer Readable Media for Providing Access Network Signaling Protocol Interworking for User Authentication," (Unpublished, filed Apr. 28, 2017).
Final Office Action for U.S. Appl. No. 14/929,283 (dated Feb. 22, 2018).
Notification of the First Office Action for Chinese Patent Application No. 201480005758.2 (dated Jan. 2, 2018).
Notice of Allowance and Fee(s) Due and Applicant-Initiated Interview Summary for U.S. Appl. No. 14/928,660 (dated Nov. 2, 2017).
Notice of Allowance and Fee(s) Due and Applicant-Initiated Interview Summary for U.S. Appl. No. 15/582,591 (dated Nov. 1, 2017).
Notice of Allowance and Fee(s) Due and Applicant-Initiated Interview Summary for U.S. Appl. No. 15/582,503 (dated Oct. 26, 2017).
Corrected Notice of Allowabililty for U.S. Appl. No. 14/929,283 (dated Jul. 19, 2018).
Non-Final Office Action for U.S. Appl. No. 14/742,679 (dated Jun. 12, 2018).
Notice of Allowance and Fee(s) Due and Applicant-Initiated Interview Summary for U.S. Appl. No. 14/929,283 (dated May 23, 2018),
Advisory Action for U.S. Appl. No. 14/929,283 (dated Apr. 12, 2018).
Communication under Rule 71(3) EPC Intention to Grant for European Patent Application Serial No. 12 741 984.4 (dated Feb. 12, 2019).
Final Office Action for U.S. Appl. No. 14/742,679 (dated Jan. 28, 2019).
Communication pursuant to Article 94(3) EPC for European Patent Application Serial No. 14 702 996.1 (dated Nov. 29, 2018).
First Examination Report for Indian Patent Application No. 6678/CHENP/2013 (dated Sep. 27, 2018).

(56) References Cited

OTHER PUBLICATIONS

Notification of the Second Office Action for Chinese Patent Application No. 201480005758.2 (dated Sep. 27, 2018).
First Examination Report for Indian Patent Application No. 6547/CHENP/2012 (dated Sep. 10, 2018).
Advisory Action Before the Filing of an Appeal Brief, Examiner-Initiated Interview Summary, and AFCP 2.0 Decision for U.S. Appl. No. 14/742,679 (dated Sep. 22, 2017).
Non-Final Office Action for U.S. Appl. No. 14/929,283 (dated Aug. 30, 2017).
Non-Final Office Action for U.S. Appl. No. 14/928,660 (dated Jul. 21, 2017).
Communication under Rule 71(3) EPC for European Patent Application Serial No. 12 751 783.7 (dated Apr. 24, 2019).
Advisory Action Before the Filing of an Appeal Brief for U.S. Appl. No. 14/742,679 (dated Apr. 17, 2019).
Hearing Notice for Indian Patent Application Serial No. 6547/CHENP/2012 (dated Mar. 25, 2019).
Notification of the Third Office Action for Chinese Patent Application Serial No. 201480005758.2 (dated Mar. 4, 2019).
Decision to grant a European patent pursuant to Article 97(1) EPC for European Patent Application Serial No. 12741984.4 (dated Jun. 27, 2019).
Letter Regarding Notification to Grant of Chinese Patent Application Serial No. 201480005758.2 (dated Jun. 6, 2019).
Communication under Rule 71(3) EPC of Intention to Grant for European Patent Application Serial No. 14 702 996.1 (dated May 10, 2019).
Office Action for Indian Patent Application Serial No. 8612/CHENP/2013 (dated Apr. 23, 2019).
Decision to grant a European patent pursuant to Article 97(1) EPC for European Patent Application Serial No. 12751783.7 (dated Aug. 29, 2019).

* cited by examiner

METHODS, SYSTEMS, AND COMPUTER READABLE MEDIA FOR PROVIDING ACCESS NETWORK SESSION CORRELATION FOR POLICY CONTROL

TECHNICAL FIELD

The subject matter described herein relates to access network protocols for authentication, authorization, and accounting on computer networks for policy control.

BACKGROUND

Mobile communications devices and subscribers typically have two or more modes for accessing network services. For example, current mobile communications devices and subscribers may be capable of accessing a cellular network (e.g., a long term evolution (LTE), 3G network, or wireless local area network (LAN)) and a fixed network, e.g., a digital subscriber line (DSL) or cable network. As mobile operators deploy and/or integrate fixed networks into their service solutions, those mobile operators will seek to integrate policy control with those fixed networks. Some fixed networks use the remote authentication dial-in user service (RADIUS) protocol for authentication, authorization, and accounting. RADIUS-based access networks can use the RADIUS Change-of-Authorization (CoA) message to apply policy from a policy server to a RADIUS client. The $3^{rd}$ Generation Partnership Project (3GPP) has defined Diameter-based interfaces for policy control.

Accordingly, there exists a need for methods, systems, and computer readable media for providing access network session correlation for policy control in systems that integrate fixed networks and mobile networks.

SUMMARY

The subject matter described herein includes methods, systems, and computer readable media for providing access network session correlation for policy control, e.g., between a RADIUS access network session and a core network Diameter session. A method for access network session correlation for policy control includes detecting a remote authentication dial in user service (RADIUS) access session for a user device, including binding the RADIUS access session to a policy node. The method includes detecting a Diameter session for the user device. The method further includes correlating the RADIUS access session with the Diameter session, including binding the Diameter session to the policy node.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
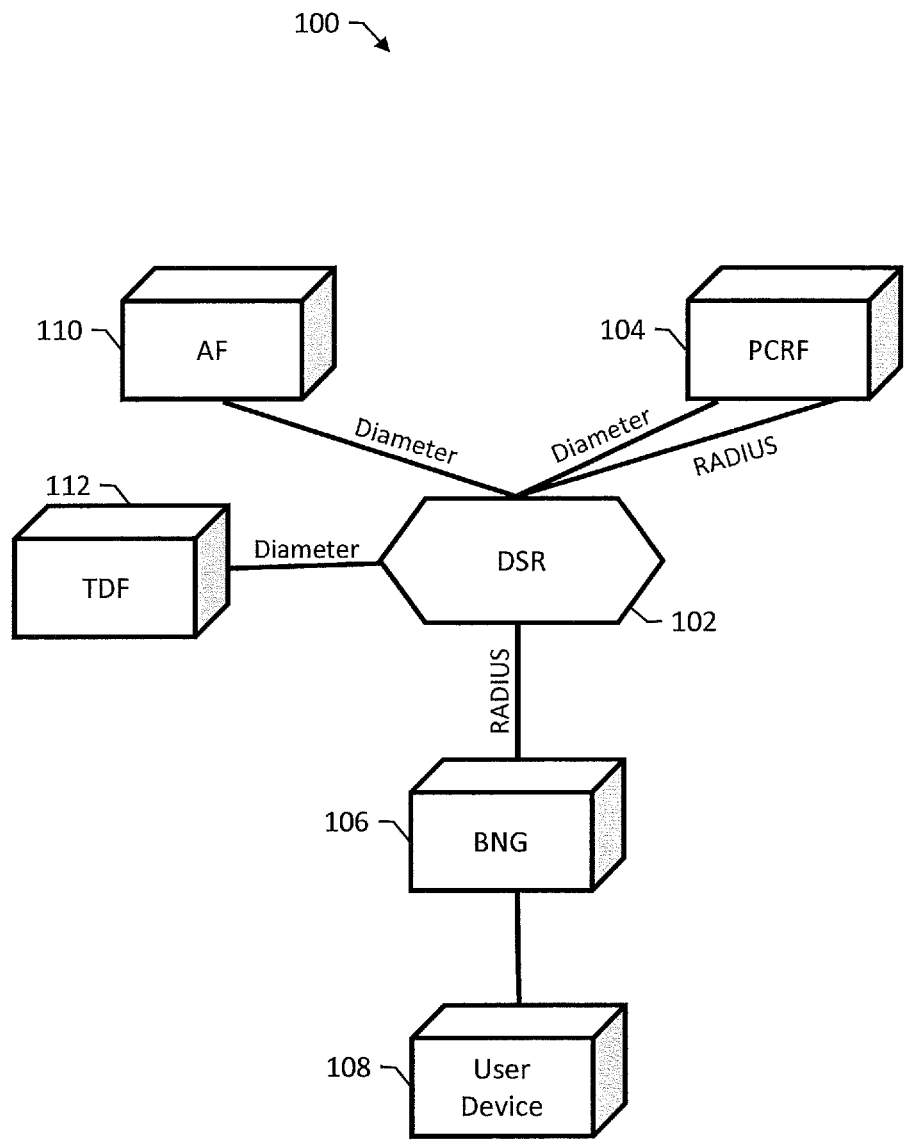
FIG. 1 is a network diagram illustrating a Diameter signaling router (DSR) that performs multi-protocol session correlation.

The subject matter described herein includes methods, systems, computer readable media for providing access network session correlation for policy control. FIG. 1 is a network diagram illustrating an example Diameter signaling router (DSR) that performs multi-protocol session correlation. Referring to FIG. 1, an example network 100 includes a DSR 102 that performs the steps described herein for correlating a RADIUS access session, e.g., a session originating from a fixed network such as a Wi-Fi network, with a Diameter session. For example, the Diameter session can be an access session or an application session originating from an application server.

DSR 102 can be implemented as a system of one or more computers executing software for routing Diameter and RADIUS messages. For example, DSR 102 may be implemented on a computing platform that includes one or more processor blades, each implementing a routing agent or other function. DSR 102 may be implemented in a distributed computing system or any appropriate system of one or more computers.

RADIUS is a networking protocol that provides authentication, authorization, and accounting management for users of a network. RADIUS is a client/server protocol that typically runs in the application layer using the user datagram protocol (UDP) for transport. Diameter is a networking protocol that evolved from RADIUS for authentication, authorization, and accounting. Diameter applications extend the base protocol by adding new commands and/or attributes, e.g., commands and attributes for use in policy and charging control. A typical Diameter packet includes a Diameter header and a variable number of attribute-value pairs (AVPs) for encapsulating information relevant to the Diameter message.

DSR 102 is configured to route both Diameter messages and RADIUS messages to policy and charging rules function (PCRF) 104. PCRF 104 can be implemented as one or more computer systems each configured to operate as a policy node for network 100. PCRF 104 is part of a 3GPP policy charging control (PCC) architecture. The elements of the PCC provide access, resource, and quality-of-service (QoS) control.

In operation, PCRF 104 functions in real-time or near real-time to determine policy rules in network 100. PCRF 104 can operate at the network core and access user information and other specialized functions in a centralized manner. PCRF 104 can aggregate information to and from network 100, operational support systems, and other sources in real time, which can be useful for the creation of rules and automatically making policy decisions for each user active on network 100. Using PCRF 104, network 100 can offer multiple services, QoS levels, and charging rules. PCRF 104 is configured to support both RADIUS and Diameter.

DSR 102 interfaces with broadband network gateway (BNG) 106 using RADIUS. BNG 106 routes network traffic to and from broadband remote access devices. User device 108 may connect to BNG 106 using, e.g., a Wi-Fi access point, a digital subscriber line (DSL) or cable modem, or any appropriate network connection.

Network 100 includes an application function (AF) 110. AF 110 can be implemented as a system of one or more computers. AF 110 communicates with PCRF 104 over a Diameter Rx interface. AF 110 can interact with applications or services that require dynamic PCC. AF 110 can extract session information from an application signal and provide the extracted information to PCRF 104.

Network 100 includes a traffic detection function (TDF) 112. TDF 112 can be implemented as a system of one or more computers. PCRF 104 communicates with TDF 112 using a Diameter Sd or other Diameter interface. TDF 112 can enforce traffic policies based on pre-set rules or dynamically determining rules by PCRF 104 on data flows in real-time or near real-time.

In some examples, DSR 102 can be implemented as a number of Diameter routing agents (DRAs) that are configured, by virtue of appropriate programming and network configuration, to collectively operative as a single routing agent. For example, DSR 102 can maintain state information (e.g., information that associates a subscriber or session with a particular server) for Diameter sessions within network 100.

The DRAs may each include a database for binding access sessions to policy nodes by maintaining associations between access sessions and policy nodes within network 100. The databases can be synchronized using one or more of any appropriate database coherency techniques, e.g., replication techniques or message-based techniques. Subscribers can be identified using any appropriate identifier, e.g., an international mobile subscriber identity (IMSI), an Internet protocol (IP) address, or a unique subscriber identifier.

To provide policy to a subscriber on a fixed network, DSR 102 can bind a RADIUS access session to a Diameter session, e.g., using the same techniques used to bind one Diameter session to another Diameter session. This can be useful, e.g., for a converged carrier to use the same policy node for both fixed and mobile connections, even if the fixed network uses RADIUS. Since DSR 102 includes software that supports stateful session binding and correlation for Diameter policy sessions, the same software and stateful database(s) can be used to bind a RADIUS access session to a policy node and potentially to one or more Diameter sessions.

Figure 2:
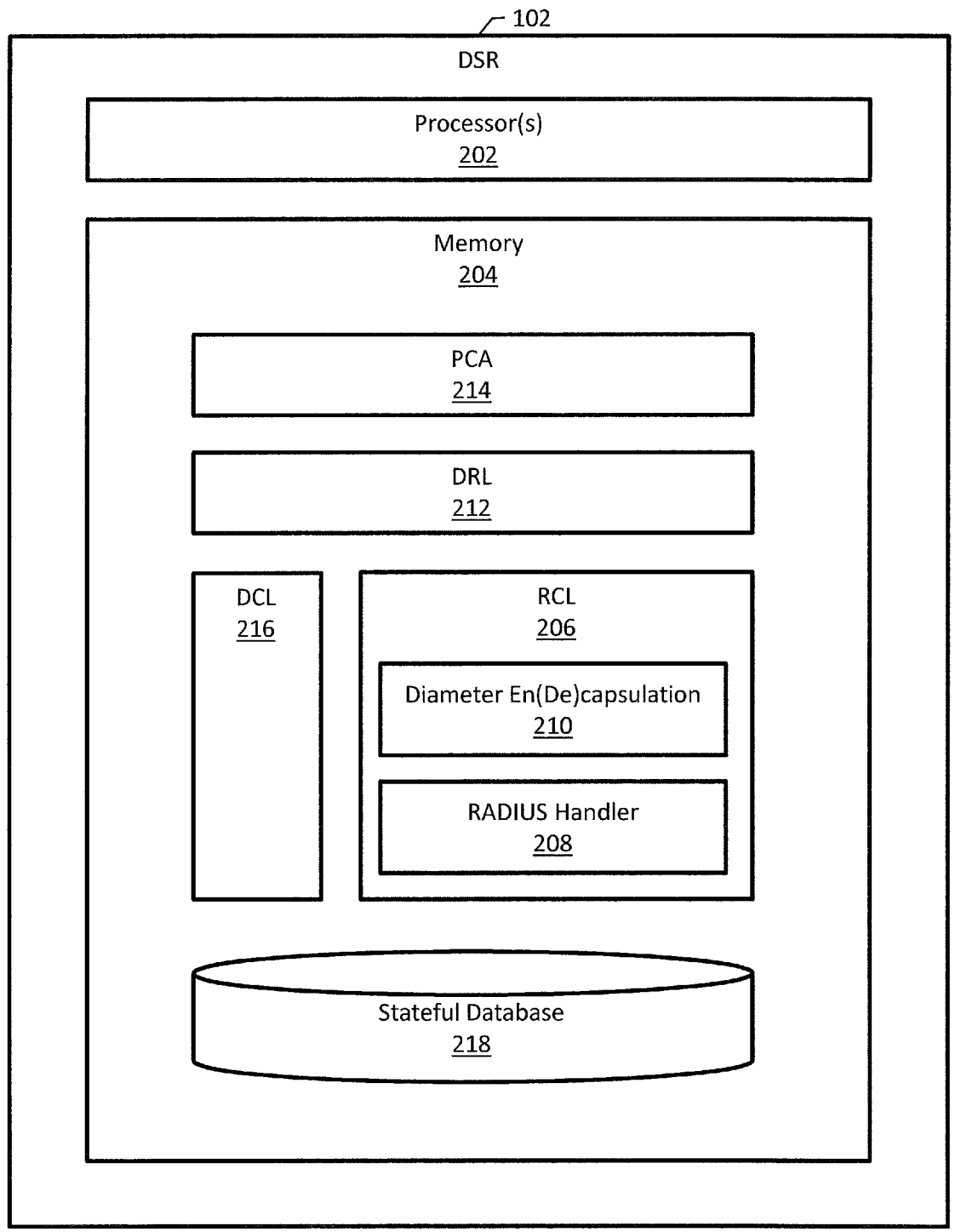
FIG. 2 is a block diagram of an example architecture for a DSR.

FIG. 2 is a block diagram of an example architecture for DSR 102. DSR 102 includes one or more processors 202 and memory 204 for storing executable instructions for processors 202 and other data. For example, DSR 102 can be implemented using one or more message processors, each of which can be implemented as a printed circuit board or blade that includes at least one processor and memory. Executable instructions can be loaded into random access memory (RAM) for execution by the processors 202.

DSR 102 includes a RADIUS connection layer (RCL) 206 including a RADIUS handler 208 and a Diameter encapsulation/decapsulation module 210. The RADIUS handler 208 receives and sends UDP messages for a RADIUS session. The Diameter encapsulation/decapsulation module 210 encapsulates received RADIUS messages into a Diameter shell and un-encapsulates outbound Diameter messages into RADIUS messages.

RCL 206 routes incoming messages to a Diameter routing layer (DRL) 212. DRL 212 can include an application routing table (ART) that DRL 212 uses to trigger a policy and charging application (PCA) 214 for a message. PCA 214 generates a response and DRL 212 routes the response message received from PCA 214 to RCL 206. RCL 206 then un-encapsulates the message and sends the message out. In some examples, RCL 206 is configured to drop error messages generated by PCA 214 or DRL 212.

PCA 214 is configured to bind and correlate Diameter sessions using a stateful database 218. When PCA 214 binds a Diameter session to a policy node, PCA 214 stores in stateful database 218 an association between the Diameter session and an identifier of the policy node so that network traffic for that Diameter session can be routed to that policy node. When PCA 214 correlates another Diameter session to the Diameter session, PCA 214 stores in stateful database 218 an association between the two Diameter sessions so that network traffic for both Diameter sessions can be routed to the same policy node.

PCA 214 can bind a RADIUS access session to a Diameter session by virtue of RCL 206, which encapsulates and un-encapsulates RADIUS messages. In this manner, PCA 214 treats a RADIUS access session as a binding-capable access session by treating it like a Diameter session. Although FIG. 2 illustrates RCL 206 as encapsulating and un-encapsulating RADIUS messages, other architectures are possible; for example, PCA 214 can be configured to handle RADIUS access sessions directly, so that the Diameter encapsulation/decapsulation module 210 may not be necessary.

The architecture illustrated in FIG. 2 is a special purpose machine that performs access network session correlation for policy control. The architecture illustrated in FIG. 2 improves the functionality of both access and cellular networks by binding RADIUS sessions to policy nodes and correlating RADIUS access sessions with Diameter sessions, e.g., Diameter sessions that are established for a user device after a RADIUS access session is established for that user device. The software infrastructure for binding and correlating Diameter sessions can be used for binding and correlating a RADIUS access session to a Diameter session. Binding and correlating a RADIUS access session to a Diameter session can be useful to a mobile operator deploying or integrating fixed networks with a mobile network for policy control because many fixed networks use RADIUS.

Figure 3:
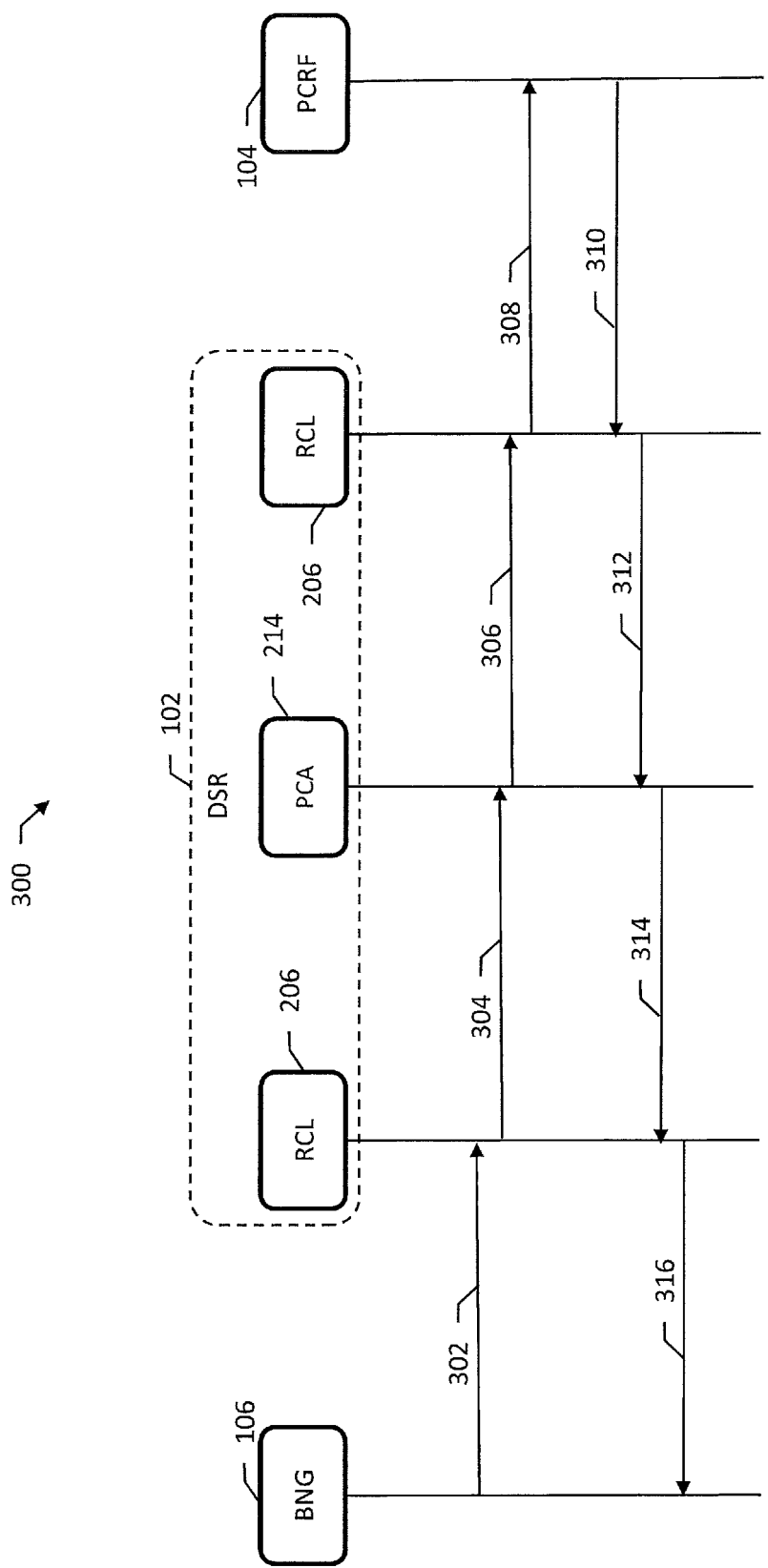
FIG. 3 is a message diagram illustrating an example RADIUS access session initiation message flow.

FIG. 3 is a message diagram illustrating an example RADIUS access session initiation message flow 300. BNG 106 initiates message flow 300 by sending an Accounting-Start message 302 to DSR 102. Accounting-Start message 302 can include the following attribute/value pairs:

Acct-Session-ID
Framed-IP-Address or IPv6-Prefix
NAS-Identifier or NAS-IP(v6)-Address RCL 206 receives Accounting-Start message 302 and encapsulates Accounting-Start message 302 into a Credit-Control-Request (CCR-I) message 304. CCR-I message 304 can include the following attribute/value pairs:

Auth-Application-ID=Ra
Origin-Host=BNG
Session-ID
Framed-IP-Address or IPv6-Prefix A new Diameter Application-ID ('Ra') is used to distinguish RADIUS sessions that are encapsulated in Diameter messages. RCL 206 sends CCR-I message 304 to PCA 214. Table 1 illustrates example values for attributes of CCR-I message 304.

TABLE 1

| Internal Diameter message | Value |
| --- | --- |
| Session-ID | Set to value of RADIUS Acct-Session-ID (if present), prefixed by client FQDN, for CCR-I/U/T. Set to 0 for CCR-E. |
| Auth-Application-ID | Set to value configured for incoming connection - new value, e.g., 'Ra' |
| Command-Code | CCR |
| CC-Request-Type | Initial, Update, Termination, or Event |
| Framed-IP-Address or Framed-IPv6-Prefix | Straight mapping from RADIUS Framed-IP-Address or Framed-IPvG-Prefix |

PCA 214 binds to PCRF 104 by creating a session binding record using a modified Acct-Session-ID as Session-ID. The Framed-IP-Address or IPv6-Prefix, if present, is stored in the session binding record. APN can be set to 'RADIUS' for Ra sessions by PCA 214.

PCA 214 generates a CCR-I message 306 that is modified from CCR-I message 304. CCR-I message 306 includes a pointer to a specific peer routing table (PRT) to use for CCR-I message 306. CCR-I message 306 also includes a Destination-Host value for CCR-U/T/E. CCR-I message 306 can include the following attribute/value pairs:

Auth-Application-ID=Ra
Origin-Host=BNG
Destination-Host=PCRF

PCA 214 sends CCR-I message 306 to RCL 206. RCL 206 un-encapsulates CCR-I message 306 and sends message 308 from DSR 102 to PCRF 104. Message 308 is the same as message 302 and is routed to PCRF 104 based on PCA 214.

PCRF 104 responds by generating an Accounting-Response message 310. PCRF 104 sends Accounting-Response message 310 to DSR 102. RCL 206 receives Accounting-Response message 310 and encapsulates Accounting-Response message 310 into a Credit-Control-Answer (CCA-I) message 312. CCA-I message 312 can include the following attribute/value pairs:

Origin-Host=PCRF
Session-ID

Table 2 illustrates example values for attributes of CCA-I message 312.

TABLE 2

| Internal Diameter message | Value |
| --- | --- |
| Command-Code | CCA |
| CC-Request-Type | Initial, Update, Termination, or Event |
| Session-ID | Same value as corresponding Diameter Request |
| Origin-Realm/Host | Use value configured for ingress peer (PCRF/AAA) |

RCL 206 sends CCA-I message 312 to PCA 214. PCA 214 processes CCA-I message 312 and sends a message 314 to RCL 206. Message 314 is the same as CCA-I message 312. RCL 206 receives message 314 and un-encapsulates message 314 to generate message 316. Message 316 is the same as Accounting-Response message 310. DSR 102 sends message 316 to BNG 106.

Figure 4:
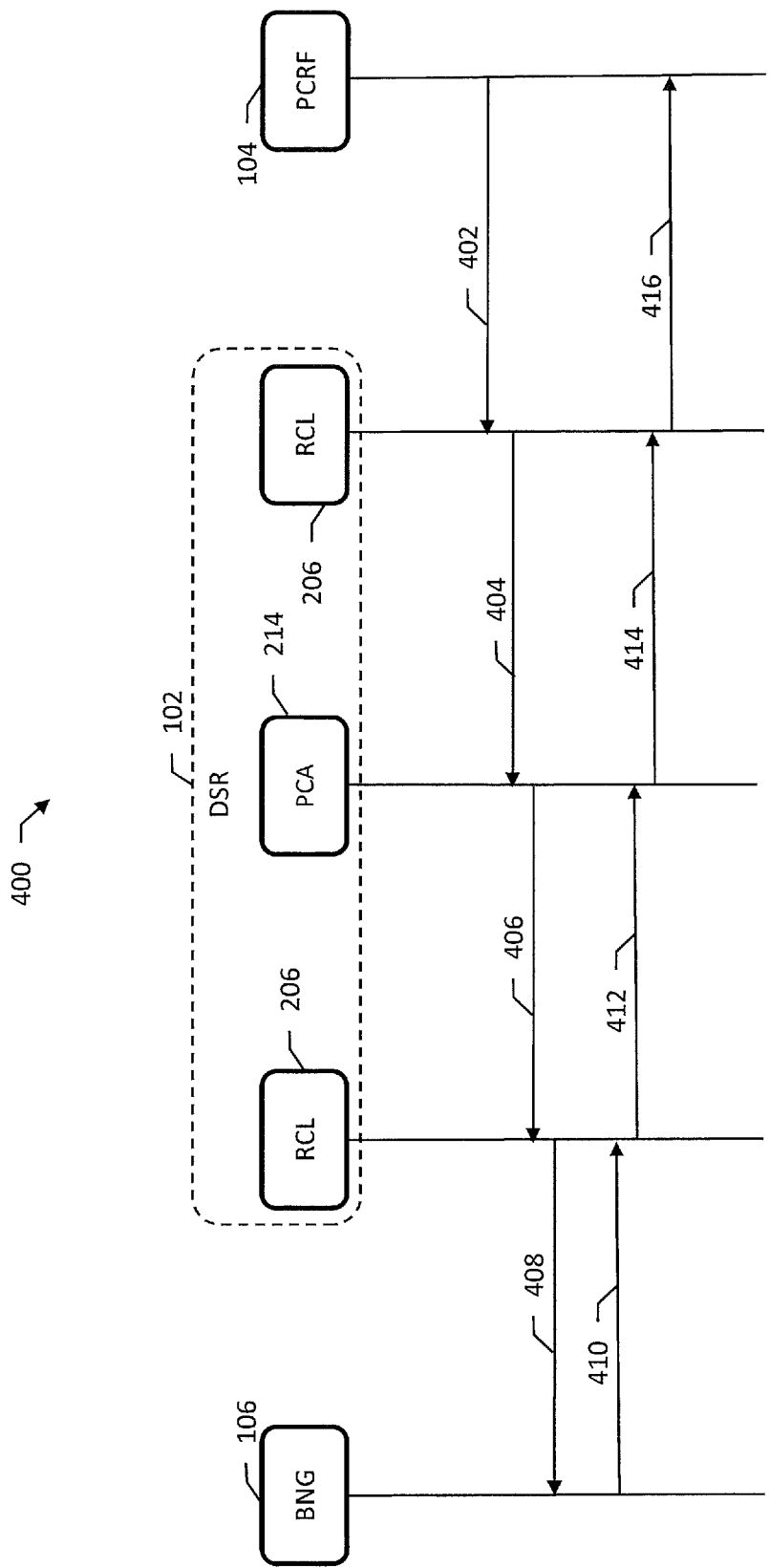
FIG. 4 is a message diagram illustrating an example message flow of policy installation or removal on an established RADIUS access session.

FIG. 4 is a message diagram illustrating an example message flow 400 of policy installation or removal on an established RADIUS access session. PCRF 104 initiates message flow 300 by sending a CoA-Request message 402 to DSR 102. CoA-Request message 402 can include the following attribute/value pairs:

NAS-Identifier or NAS-IP(v6)-Address
Acct-Session-ID
VAS rule set

RCL 206 receives CoA-Request message 402 and encapsulates CoA-Request message 402 into a Re-Auth-Request (RAR) message 404. RAR message 404 can include the following attribute/value pairs:

Auth-Application-I D=Ra
Origin-Host=PCRF
Destination-Host=BNG
Session-ID

Table 3 illustrates example values for attributes of RAR message 404.

TABLE 3

| Internal Diameter message | Value |
| --- | --- |
| Session-ID | Set to value of RADIUS Acct-Session-ID, prefixed by NAS FQDN |
| Auth-Application-ID | Set to value configured for incoming connection e.g., new value 'Ra' |
| Command-Code | RAR |
| Framed-IP-Address or Framed-IPv6-Prefix | Straight mapping from RADIUS Framed-IP-Address or Framed-IPv6-Prefix |

RCL 206 sends RAR message 404 to PCA 214. PCA 214 can use RAR message 404 to update a session timer for the RADIUS access session. PCA 214 can be configured to maintain user-configurable session timers per Access Point Name (APN). PCA 214 can create an APN for the RADIUS access session, and then PCA 214 can maintain the session timer for the RADIUS access session and update the session timer each time a message is processed for that session. In response to detecting a session timeout, PCA 214 can delete a session and the bindings associated with the session. The Acct-Session-ID value can be used as the Session-ID value in the session binding record.

PCA 214 sends a message 406 back to RCL 206. Message 406 is the same as RAR message 404. RCL 206 un-encapsulates message 406 to generate a message 408. Message 408 is the same as CoA-Request message 402. RCL 206 sends message 408 to BNG 106.

BNG 106 generates a CoA-ACK/NAK message 410 and sends CoA-ACK/NAK message 410 to DRL 102. RCL 206 receives CoA-ACK/NAK message 410 and encapsulates CoA-ACK/NAK message 410 into a Re-Auth-Answer (RAA) message 412. RAA message 412 can include the following attribute/value pairs:
  Origin-Host=BNG
  Session-ID Table 4 illustrates example values for attributes of RAA message 412.

TABLE 4

| Internal Diameter message | Value |
| --- | --- |
| Command-Code | RAA |
| Session-ID | Same value as corresponding Diameter Request |
| Origin-Realm/Host | Use value configured for ingress peer |

RAA message 412 can include these values regardless of whether a CoA-ACK or CoA-NAK was received. RCL 206 sends RAA message 412 to PCA 214. PCA 214 processes RAA message 412 and sends a message 414 back to RCL 206. Message 414 is the same as RAA message 412.

RCL 206 un-encapsulates message 414 and generates CoA-ACK/NAK message 416. CoA-ACK/NAK message 416 is the same as CoA-ACK/NAK message 410. RCL 206 sends CoA-ACK/NAK message 416 to PCRF 104.

Figure 5:
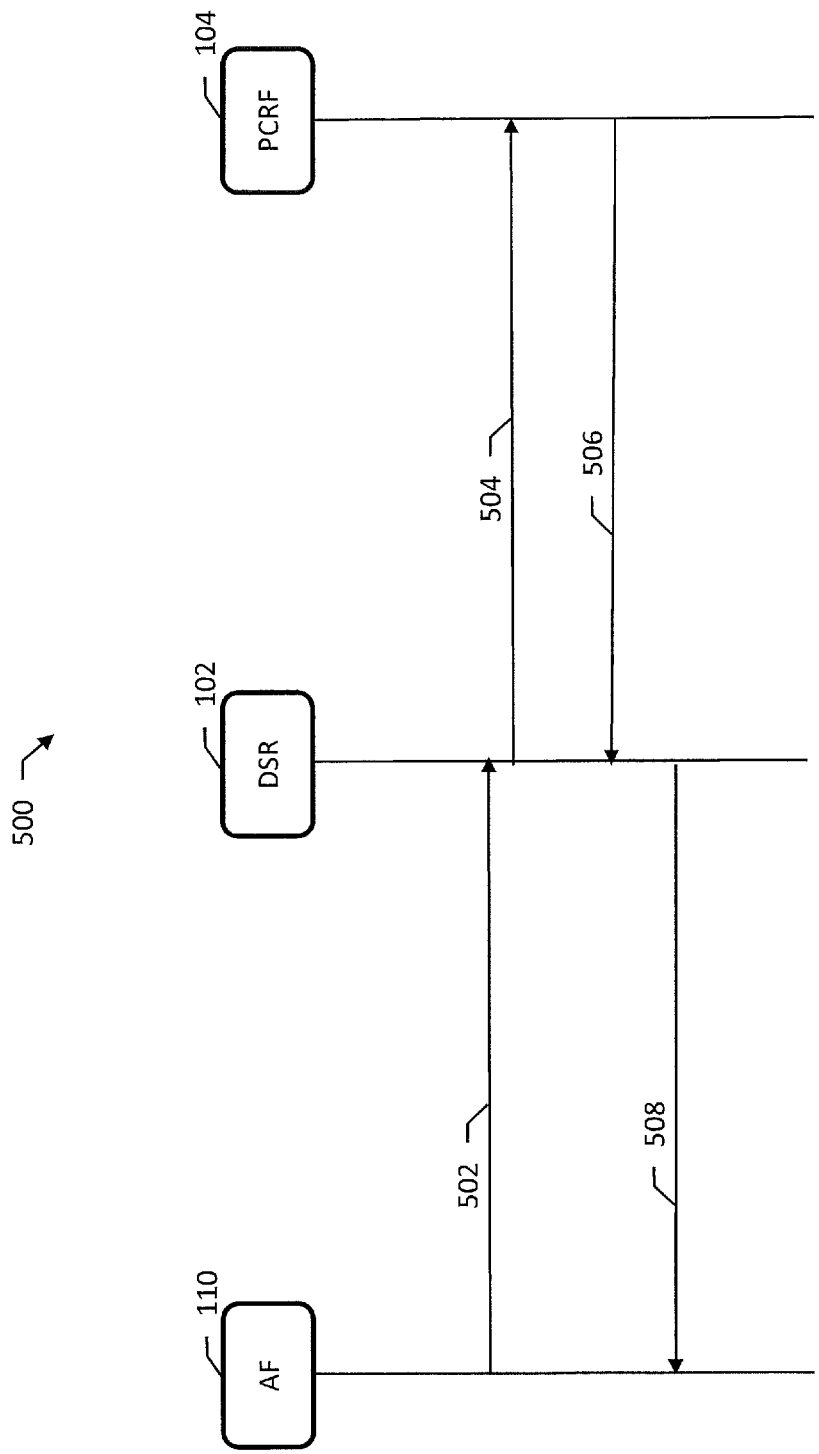
FIG. 5 is a message diagram illustrating an example message flow in which a RADIUS access session is correlated to a Diameter session.

FIG. 5 is a message diagram illustrating an example message flow 500 in which a RADIUS access session is correlated to a Diameter session. AF 110 initiates message flow 500 by sending an AA-Request (AAR) message 502 to DSR 102. AAR message 502 can include the following attribute/value pairs:
  Session-ID
  Framed-IP-Address/IPv6-Prefix DSR 102 routes the AAR message 502 to PCRF 104 by sending a message 504 to PCRF 104. Message 504 is the same as AAR message 502. PCRF 104 responds by sending an AA-Answer (AAA) message 506 to DSR 102. DSR 102 routes the AAA message 506 to AF 110 by sending a message 508 to AF 110. Message 508 is the same as AAA message 506. Message flow 500 establishes an Rx session for AF 110 and PCRF 104.

DSR 102 can determine that the Rx session is associated with a same user device as the RADIUS access session established, e.g., by message flow 300 in FIG. 3. For example, DSR 102 can determine that both sessions share the same IP address, i.e., have the same Framed-IP-Address/IPv6-Prefix value. In response to determining that both sessions are associated with the same user device, DSR 102 binds the Rx session to the same PCRF 104 and correlates the Rx session with the RADIUS session so that a mobile operator can apply policy controls to both sessions using the same policy node.

Figure 6:
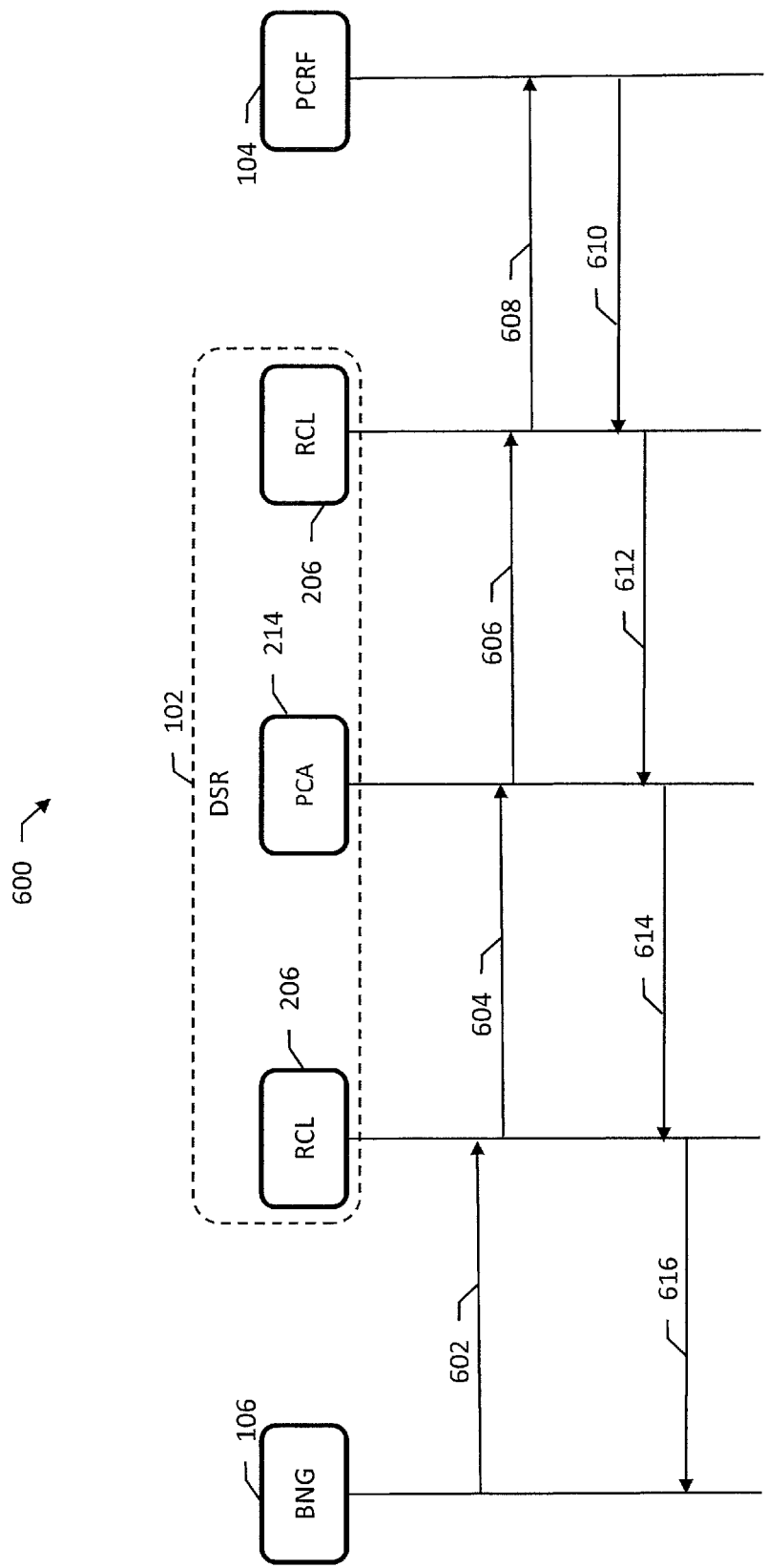
FIG. 6 is a message diagram illustrating an example RADIUS session termination message flow.

FIG. 6 is a message diagram illustrating an example RADIUS session termination message flow 600. In some examples, message flow 600 is triggered by a CoA message from PCRF 104 that removes services from BNG 106. BNG 106 initiates message flow 600 by sending an Accounting-Stop message 602 to DSR 102. Accounting-Stop message 602 can include the following attribute/value pairs:
  Acct-Session-ID
  NAS-Identifier or NAS-IP(v6)-Address RCL 206 receives Accounting-Stop message 602 and encapsulates Accounting-Stop message 602 into a Credit-Control-Request (CCR-T) message 604. CCR-T message 604 can include the following attribute/value pairs:
  Auth-Application-ID=Ra
  Origin-Host=BNG
  Session-ID RCL 206 sends CCR-T message 604 to PCA 214. PCA 214 generates a CCR-T message 606 that is modified from CCR-T message 604. CCR-T message 604 can include the following attribute/value pairs:
  Auth-Application-ID=Ra
  Origin-Host=BNG
  Destination-Host=PCRF PCA sends CCR-T message 606 to RCL 206. RCL 206 un-encapsulates CCR-T message 606 and sends message 608 from DSR 102 to PCRF 104. Message 608 is the same as Accounting-Stop message 602 and is routed to PCRF 104 based on PCA 214.

PCRF 104 responds by generating an Accounting-Response message 610. PCRF 104 sends Accounting-Response message 610 to DSR 102. RCL 206 receives Accounting-Response message 610 and encapsulates Accounting-Response message 610 into a Credit-Control-Answer (CCA-T) message 612. CCA-T message 612 can include the following attribute/value pairs:
  Origin-Host=PCRF
  Session-ID RCL 206 sends CCA-T message 612 to PCA 214. PCA 214 processes CCA-T message 612 by deleting the RADIUS access session and all associated binding information in response to receiving CCA-T message 612. PCA sends a message 614 to RCL 206. Message 614 is the same as CCA-T message 612. RCL 206 receives message 614 and un-encapsulates message 614 to generate message 616. Message 616 is the same as Accounting-Response message 610. DSR 102 sends message 616 to BNG 106.

Figure 7:
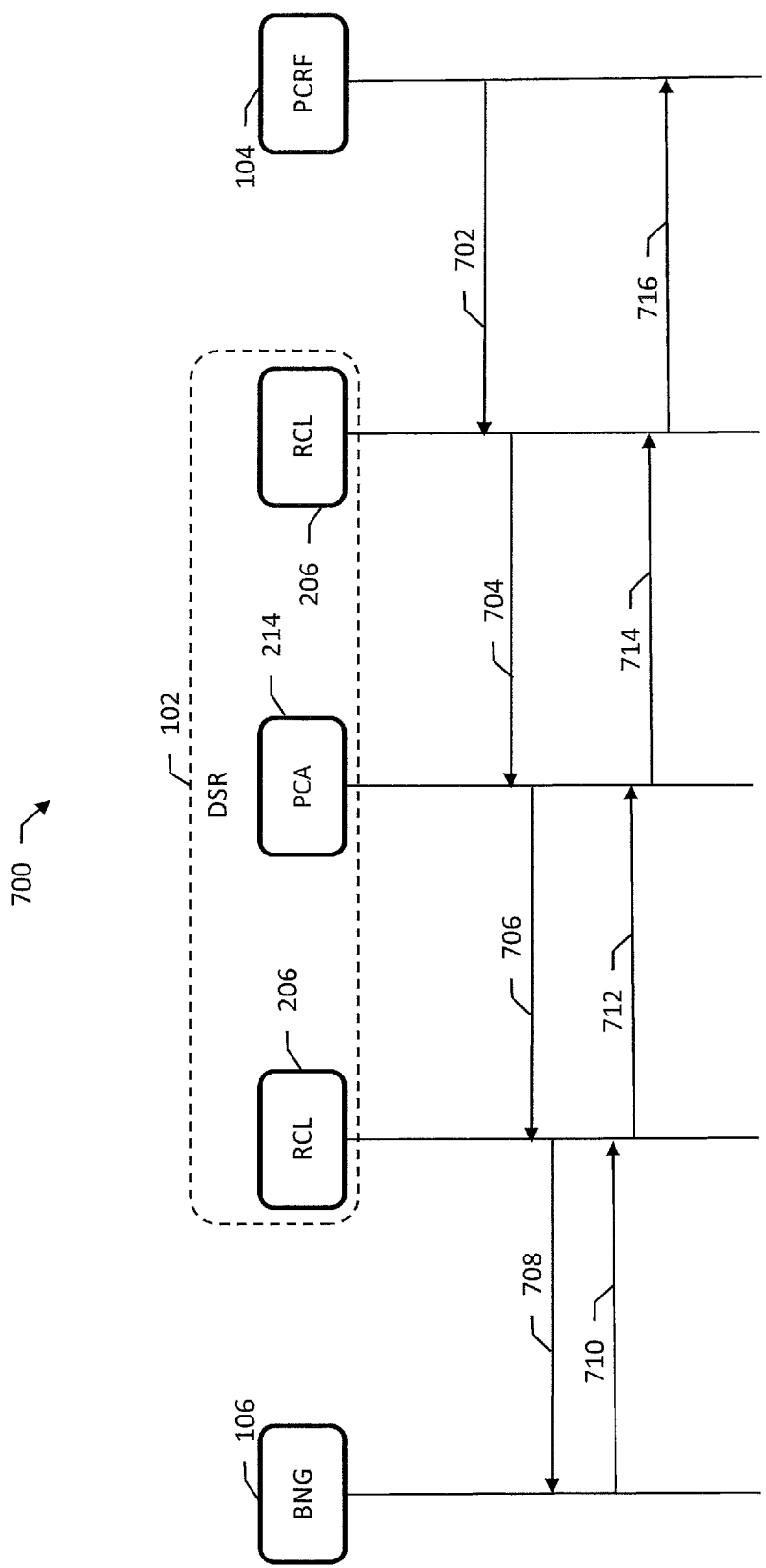
FIG. 7 is a message diagram illustrating an example message flow for session termination by a PCRF-initiated disconnect.

FIG. 7 is a message diagram illustrating an example message flow 700 for session termination by a PCRF-initiated disconnect. PCRF 104 initiates message flow 700 by sending a Disconnect-Request message 702 to DSR 102. Disconnect-Request message 702 can include the following attribute/value pairs:
  NAS-Identifier or NAS-IP(v6)-Address
  Acct-Session-ID RCL 206 receives Disconnect-Request message 702 and encapsulates Disconnect-Request message 702 into a RADIA-Request (RDR) message 704. RDR message 704 can include the following attribute/value pairs:
  Auth-Application-ID=Ra
  Origin-Host=PCRF
  Destination-Host=BNG
  Session-ID RCL 206 sends RDR message 704 to PCA 214. PCA 214 deletes the RADIUS session in response to receiving RDR message 704. PCA 214 sends a message 706 back to RCL 206. Message 706 is the same as RDR message 704. RCL 206 un-encapsulates message 706 to generate a message 708. Message 708 is the same as Disconnect-Request message 702. RCL 206 sends message 708 to BNG 106.

BNG 106 generates a Disconnect-ACK/NAK message 710 and sends Disconnect-ACK/NAK message 710 to DRL 102. RCL 206 receives Disconnect-ACK/NAK message 710 and encapsulates Disconnect-ACK/NAK message 710 into a RADIA-Answer (RDA) message 712. RDA message 712 can include the following attribute/value pairs:

Origin-Host=BNG
Session-ID

RCL 206 sends RDA message 712 to PCA 214. PCA 214 processes RDA message 712 and sends a message 714 back to RCL 206. Message 714 is the same as RDA message 712.

RCL 206 un-encapsulates message 714 and generates Disconnect-ACK/NAK message 716. Disconnect-ACK/NAK message 716 is the same as Disconnect-ACK/NAK message 710. RCL 206 sends Disconnect-ACK/NAK message 710 to PCRF 104. If BNG 106 sends an Accounting-Stop message after PCA 214 processes RDR message 704, the session will not be found by PCA 214.

Figure 8:
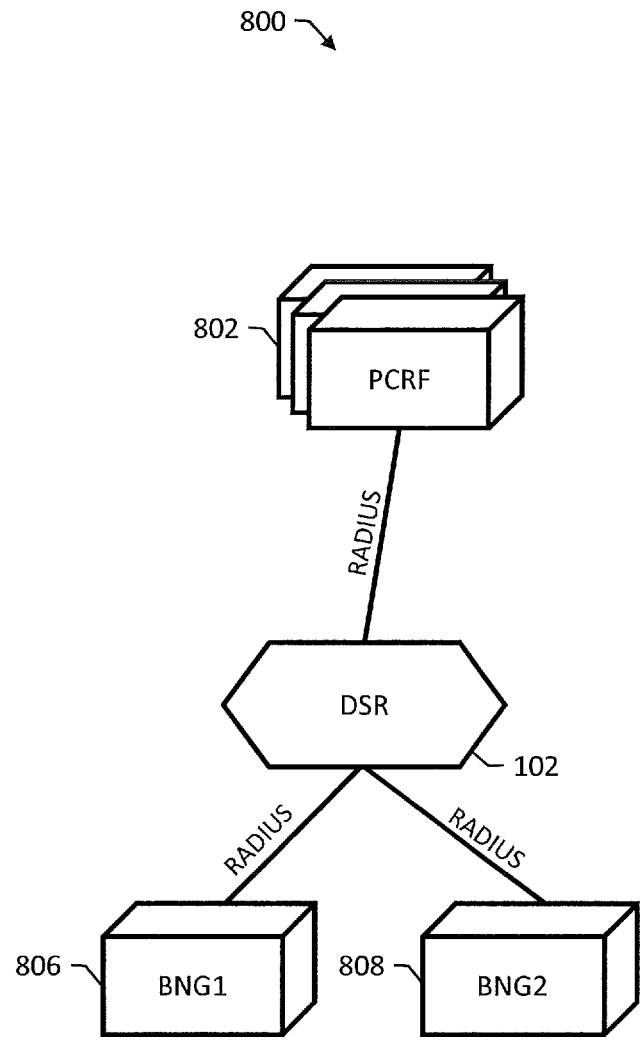
FIG. 8 is a network diagram of an example network for RADIUS access session accounting and policy support.

FIG. 8 is a network diagram of an example network 800 for RADIUS access session accounting and policy support. In example network 800, DSR 102 can be configured to use, e.g., PCA 214 of FIG. 2, to provide stateful, session-based routing for policy from PCRF nodes 802. The routing for policy can be supported by the same DSR 102. PCA PCRF sub-pooling can be used to separate network traffic for messages originating at different BNGs, e.g., for messages originating from BNG1 806 and BNG2 808.

Figure 9:
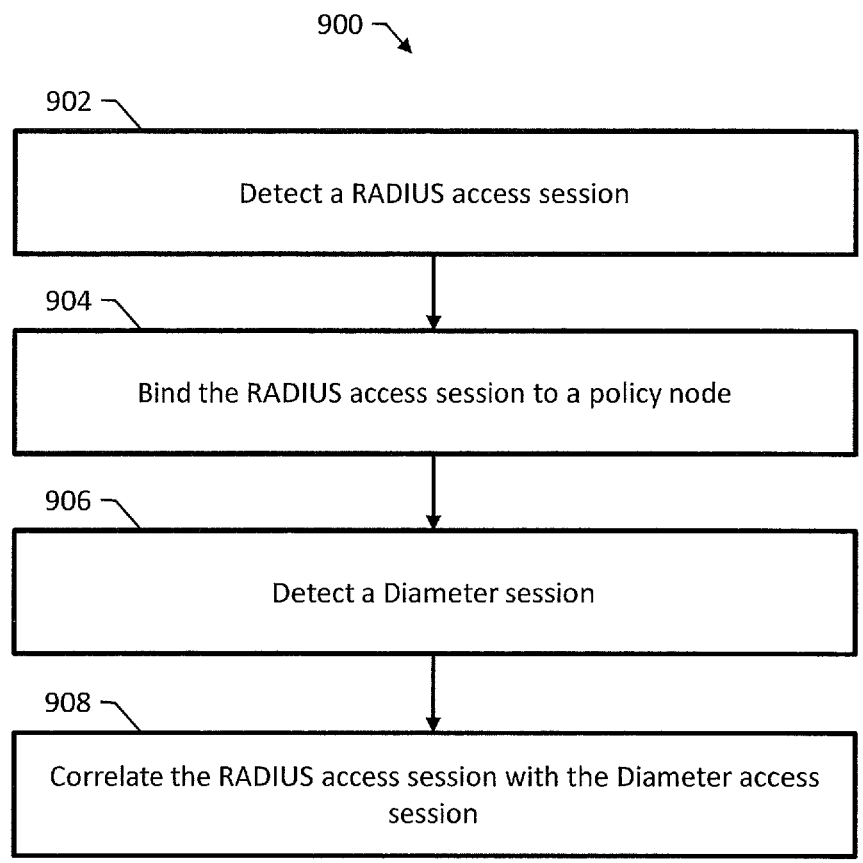
FIG. 9 is a flow diagram of an example method for providing multi-protocol session correlation for policy control.

FIG. 9 is a flow diagram of an example method 900 for providing multi-protocol session correlation for policy control. The method 900 is performed by a DSR including at least one message processor, e.g., DSR 102 of FIG. 1 and FIG. 2.

The DSR detects a RADIUS access session for a user device (902). For example, detecting the RADIUS access session can include receiving a request message from an access gateway, routing the request message to a policy charging and rules function (PCRF), and routing a response message from the PCRF to the access gateway to establish a fixed network connection for the user device. The access gateway can be, e.g., a broadband network gateway (BNG) or a WLAN access gateway (WAG). Other examples of access gateways include packet data network gateways (PGWs) and GPRS support nodes (GGSNs).

The DSR binds the RADIUS access session to a policy node (904) Binding the RADIUS session can include storing RADIUS session information for the RADIUS access session in a stateful session database. The RADIUS session information can be, e.g., an Acct-Session-ID value and an Internet protocol (IP) address or subscriber identifier from a RADIUS Accounting-Request message. In some examples, detecting the RADIUS access session includes maintaining a session timer for the RADIUS access session, updating the session timer each time a message is processed for the RADIUS access session, and, in response to detecting a session timeout using the session timer, deleting the RADIUS access session and any bindings for the RADIUS access session.

In some examples, detecting the RADIUS access session includes receiving a RADIUS request message, translating the RADIUS request message into a Diameter request message, determining routing information for the RADIUS request message using the Diameter request message, and routing the RADIUS request message using the routing information. The RADIUS request message can be an Accounting-Start message and the Diameter request message can be a Credit-Control-Request (CCR) message.

The DSR detects a Diameter session for the user device (906). The Diameter session can be, e.g., an access session or an application session. For example, detecting the Diameter session can include receiving a request message from an application function (AF) or a traffic detection function (TDF) routing the request message to a policy charging and rules function (PCRF) and routing a response message from the PCRF to the AF or TDF. Although FIG. 9 illustrates detecting the RADIUS access session before the Diameter session, in some cases, the DSR will detect the Diameter session before detecting the RADIUS session. In those cases, the DSR can still correlate the RADIUS access session to the Diameter session.

The DSR correlates the RADIUS access session to the Diameter session, including binding the Diameter session to the policy node (908). For example, correlating the RADIUS session with the Diameter session can include comparing Diameter session information for the Diameter session with the RADIUS session information and determining that the Diameter session corresponds to the user device of the RADIUS session. The DSR can receive a Change-of-Authorization (CoA) command from the policy node and route the CoA command for policy installation and/or removal for the RADIUS access session.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein.

Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for access network session correlation for policy control, the method comprising:
    in a Diameter signaling router (DSR) including at least one message processor:
        detecting a remote authentication dial in user service (RADIUS) access session for a user device, including identifying a policy node from a plurality of policy nodes and binding the RADIUS access session to the policy node and routing RADIUS messages for the RADIUS access session from the DSR to the policy node, wherein detecting the RADIUS access session comprises receiving a request message from an access gateway, routing the request message to a policy and charging rules function (PCRF) configured to receive and process both RADIUS and Diameter messages and to provide one or more policy services for both RADIUS and Diameter access sessions, and routing a response message from the PCRF to the access gateway to establish a fixed network connection for the user device;
        detecting a Diameter session for the user device;
        correlating the RADIUS access session with the Diameter session, including binding the Diameter session to the policy node in response to determining that the Diameter session corresponds to the RADIUS access session and routing Diameter messages for the Diameter session from the DSR to the policy node; and after correlating the RADIUS access session with the Diameter session, routing both the RADIUS messages for the RADIUS access session for the user device to the policy node and the Diameter messages for the RADIUS access session for the same user device to the policy node.

2. The method of claim 1, wherein detecting the Diameter session comprises receiving a request message from an application function (AF) or a traffic detection function (TDF) or the access gateway, routing the request message to the PCRF, and routing a response message from the PCRF to the AF or TDF or access gateway.

3. The method of claim 1, wherein detecting the RADIUS access session comprises storing RADIUS session information for the RADIUS access session in a stateful session database.

4. The method of claim 3, wherein correlating the RADIUS access session with the Diameter session comprises comparing Diameter session information for the Diameter session with the RADIUS session information.

5. The method of claim 3, wherein storing RADIUS session information comprises storing an Acct-Session-ID value and an Internet protocol (IP) address or subscriber identifier from a RADIUS Accounting-Request message.

6. The method of claim 1, wherein detecting the RADIUS access session comprises maintaining a session timer for the RADIUS access session, updating the session timer each time a message is processed for the RADIUS access session, and, in response to detecting a session timeout using the session timer, deleting the RADIUS access session and any bindings for the RADIUS access session.

7. The method of claim 1, comprising receiving a Change-of-Authorization (CoA) command from the policy node and routing the CoA command for policy installation and/or removal for the RADIUS access session.

8. The method of claim 1, wherein the RADIUS request message is an Accounting-Start message and the Diameter request message is Credit-Control-Request (CCR) message.

9. A system comprising:
a Diameter signaling router (DSR) including at least one message processor;
a remote authentication dial in user service (RADIUS) connection layer, implemented using the DSR, for detecting a remote authentication dial in user service (RADIUS) access session for a user device, including identifying a policy node from a plurality of policy nodes and binding the RADIUS access session to the policy node and routing RADIUS messages for the RADIUS access session from the DSR to the policy node, wherein detecting the RADIUS access session comprises receiving a request message from an access gateway, routing the request message to a policy and charging rules function (PCRF) configured to receive and process both RADIUS and Diameter messages and to provide one or more policy services for both RADIUS and Diameter access sessions, and routing a response message from the PCRF to the access gateway to establish a fixed network connection for the user device;
a policy charging application, implemented using the DSR, for correlating the RADIUS access session with the Diameter session, including binding the Diameter session to the policy node in response to determining that the Diameter session corresponds to the RADIUS access session and routing Diameter messages for the Diameter session from the DSR to the policy node;
wherein the policy charging application is configured for, after correlating the RADIUS access session with the Diameter session, routing both the RADIUS messages for the RADIUS access session for the user device to the policy node and the Diameter messages for the RADIUS access session for the same user device to the policy node.

10. The system of claim 9, wherein the DSR is configured to detect the Diameter session by receiving a request message from an application function (AF) or a traffic detection function (TDF) or the access gateway and routing the request message to the PCRF and routing a response message from the PCRF to the AF or TDF or access gateway.

11. The system of claim 9, wherein detecting the RADIUS access session comprises storing RADIUS session information for the RADIUS access session in a stateful session database.

12. The system of claim 11, wherein correlating the RADIUS access session with the Diameter session comprises comparing Diameter session information for the Diameter session with the RADIUS session information.

13. The system of claim 11, wherein storing RADIUS session information comprises storing an Acct-Session-ID value and an Internet protocol (IP) address or subscriber identifier from a RADIUS Accounting-Request message.

14. The system of claim 9, wherein detecting the RADIUS access session comprises maintaining a session timer for the RADIUS access session, updating the session timer each time a message is processed for the RADIUS access session, and, in response to detecting a session timeout using the session timer, deleting the RADIUS access session and any bindings for the RADIUS access session.

15. The system of claim 9, comprising receiving a Change-of-Authorization (CoA) command from the policy node and routing the CoA command for policy installation and/or removal for the RADIUS access session.

16. The system of claim 9, wherein the RADIUS request message is an Accounting-Start message and the Diameter request message is Credit-Control-Request (CCR) message.

17. A non-transitory computer readable medium having stored thereon executable instructions that when executed by a processor on a computer control the computer to perform steps comprising:
detecting a remote authentication dial in user service (RADIUS) access session for a user device, including identifying a policy node from a plurality of policy nodes and binding the RADIUS access session to the policy node and routing RADIUS messages for the RADIUS access session from the DSR to the policy node, wherein detecting the RADIUS access session comprises receiving a request message from an access gateway, routing the request message to a policy and charging rules function (PCRF) configured to receive and process both RADIUS and Diameter messages and to provide one or more policy services for both RADIUS and Diameter access sessions, and routing a response message from the PCRF to the access gateway to establish a fixed network connection for the user device;
detecting a Diameter session for the user device;
correlating the RADIUS access session with the Diameter session, including binding the Diameter session to the policy node in response to determining that the Diameter session corresponds to the RADIUS access session and routing Diameter messages for the Diameter session from the DSR to the policy node; and after correlating the RADIUS access session with the Diameter session, routing both the RADIUS messages for the RADIUS access session for the user device to the policy node and the Diameter messages for the RADIUS access session for the user device to the policy node.

\* \* \* \* \*

UNITED STATES PATENT AND TRADEMARK OFFICE
CERTIFICATE OF CORRECTION

PATENT NO. : 10,554,661 B2
APPLICATION NO. : 14/826289
DATED : February 4, 2020
INVENTOR(S) : McCann Page 1 of 2

It is certified that error appears in the above-identified patent and that said Letters Patent is hereby corrected as shown below:

On the Title Page

On page 4, Column 1, item (56) under Other Publications, Line 17, delete "2014-5093509" and insert -- 2014-509509 --, therefor.

On page 4, Column 2, item (56) under Other Publications, Line 34, delete "fubiication" and insert -- publication --, therefor.

On page 4, Column 2, item (56) under Other Publications, Line 51, delete "13/409,349" and insert -- 13/409,949 --, therefor.

On page 5, Column 1, item (56) under Other Publications, Line 14, delete "Transmital" and insert -- Transmittal --, therefor.

On page 5, Column 1, item (56) under Other Publications, Line 48, delete "2011." and insert -- 2011). --, therefor.

On page 5, Column 2, item (56) under Other Publications, Line 2, delete "3GPPP" and insert -- 3GPP --, therefor.

On page 5, Column 2, item (56) under Other Publications, Line 13, delete "(LTE+ePC=SDM,""" and insert -- (LTE+ePC=EPS), IMS, PCC and SDM," --, therefor.

On page 5, Column 2, item (56) under Other Publications, Line 39, delete "Singalling" and insert -- Signalling --, therefor.

On page 5, Column 2, item (56) under Other Publications, Line 51, delete "Requirment" and insert -- Requirement --, therefor.

Signed and Sealed this
Tenth Day of November, 2020

Andrei Iancu
*Director of the United States Patent and Trademark Office*

CERTIFICATE OF CORRECTION (continued)
U.S. Pat. No. 10,554,661 B2

On page 5, Column 2, item (56) under Other Publications, Line 62, delete "Ceilular" and insert -- Cellular --, therefor.

On page 6, Column 1, item (56) under Other Publications, Line 4, delete "Muitimedia" and insert -- Multimedia --, therefor.

On page 6, Column 1, item (56) under Other Publications, Line 24, delete "TS 9.229," and insert -- TS 29.229, --, therefor.

On page 6, Column 1, item (56) under Other Publications, Line 36, delete "(Dowloaded" and insert -- (Downloaded --, therefor.

On page 6, Column 1, item (56) under Other Publications, Line 49, delete "Sewer" and insert -- Server --, therefor.

On page 6, Column 1, item (56) under Other Publications, Line 59, delete "Appication" and insert -- Application --, therefor.

On page 6, Column 2, item (56) under Other Publications, Line 2, delete "Applicaton" and insert -- Application --, therefor.

On page 6, Column 2, item (56) under Other Publications, Line 37, delete "Divisonal" and insert -- Divisional --, therefor.

On page 6, Column 2, item (56) under Other Publications, Line 41, delete "co-pending U.S." and insert -- co-pending Divisional U.S. --, therefor.

On page 6, Column 2, item (56) under Other Publications, Line 55, delete "Allowabililty" and insert -- Allowability --, therefor.

On page 6, Column 2, item (56) under Other Publications, Lines 71-72, delete "6678/CHENP/2013" and insert -- 6878/CHENP/2013 --, therefor.

In the Specification

In Column 5, Line 35, delete "-IPvG-" and insert -- -IPv6- --, therefor.